(12) United States Patent
Clemmons

(10) Patent No.: US 6,439,161 B1
(45) Date of Patent: Aug. 27, 2002

(54) EXTERIOR LITTERBOX

(76) Inventor: Ronald E. Clemmons, 404 SW. Maynard Rd., Cary, NC (US) 27511

(*) Notice: Subject to any disclaimer, the term of this patent is extended or adjusted under 35 U.S.C. 154(b) by 0 days.

(21) Appl. No.: 10/015,021

(22) Filed: Dec. 11, 2001

Related U.S. Application Data

(60) Provisional application No. 60/254,861, filed on Dec. 13, 2000.

(51) Int. Cl.[7] ............................................. A01K 1/035
(52) U.S. Cl. .............................................. 119/165
(58) Field of Search ..................... 119/162, 165, 119/166, 484, 485

(56) References Cited

U.S. PATENT DOCUMENTS

| | | | | |
|---|---|---|---|---|
| 4,934,317 A | * | 6/1990 | Pourshalchi | 119/165 |
| 5,027,451 A | * | 7/1991 | Wooten et al. | 119/162 X |
| 5,394,835 A | * | 3/1995 | Gatta | 119/170 |
| 5,975,017 A | * | 11/1999 | Cameron | 119/165 |

* cited by examiner

Primary Examiner—Robert P. Swiatek
(74) Attorney, Agent, or Firm—Mills Law Firm PLLC

(57) ABSTRACT

A litterbox enclosure mounted on an exterior wall of a structure includes a gated passage permitting a pet free access to and from a litter container. The litter container may be filled and maintained from an outside location through an exterior access door. An exterior actuator handle pivots the container to discharge the contents into a lower chute to which a conventional plastic waste bag is secured, thereby avoiding direct contact between the attendant and the waste material.

15 Claims, 6 Drawing Sheets

EXTERIOR LITTERBOX

RELATED APPLICATION

This application claims the benefit under 35 USC 121 of U.S. Provisional Application No. 60/254,861 filed on Dec. 13, 2000 in the name of Ronald E. Clemmons and entitled "Exterior Litterbox".

FIELD OF THE INVENTION

The present invention relates to litterboxes for pets, and, in particular, to a litterbox mounted exterior of a dwelling for use by cats kept indoors as pets.

BACKGROUND OF THE INVENTION

A multitude of approaches have been taken for simplifying the maintenance of litterboxes used primarily for indoor pets such as cats. Efforts have also been made to simplify litter replacement without affecting adversely the needs of the pet or exposing the owner directly to soiled litter and accumulations. Inasmuch as cats often scratch and paw the litter after use, scattering of the contents is commonplace and presents an ongoing maintenance problem. Moreover, normal use presents odor problems and intensifies over time, periodically requiring manual cleaning of the soiled litter and accumulation and eventually removal and disposal of the contents.

Numerous devices have been proposed for mounting litterboxes exterior of the normal indoor quarters. Many have taken the form of a roofed enclosure mounted on the exterior of the dwelling. The enclosure is accessible by the pet through adapting an existing window opening or modifying an existing exterior wall. For example, U.S. Pat. No. 5,970,914 to Steil et al. provides a shelter that is mounted on an exterior wall and accessible through an opening therein. A conventional litter box is releasably coupled to the base of the shelter. While removing the litterbox from the indoor space, limited ventilation is provided and odors may still be experienced. Moreover, cleaning and replacement of the litter requires decoupling the box and manually servicing the litter in a conventional fashion. A similar approach is disclosed in U.S. Pat. No. 5,261,350 to Vavrek wherein an outdoor enclosure, accessible through a wall opening, is provided with a litterbox that is exteriorally serviced and maintained.

A window mounted litterbox is disclosed in U.S. Pat. No. 5,842,438 to Messmer wherein a conventional litterbox is located within asecondary compartment in an exterior housing. The litterbox is serviced in a conventional manner through an interior access door. Limited ventilation is provided by a pressure differential flap. Another widow-mounted litterbox is disclosed in U.S. Pat. No. 5,195,457 to Namanny wherein a litterbox located in an exterior enclosure is serviced in a conventional manner through an interior access door. A further window mounted litterbox is disclosed in U.S. Pat. No. 5,165,366 to Harvey wherein a litterbox in an exterior enclosure may be removed exterior of the building for outdoor cleaning in the conventional manner. While removing the litter site from the indoor environment, servicing and disposal of the litter are handled in much the same manner as indoor boxes, requiring direct personal contact with the cleaning process. Improvements in ongoing disposal of pet wastes, particularly for birds, have been proposed in U.S. Pat. No. 4,572,107 to Clarizo and U.S. Pat. No. 4,838,204 to Young; however, such systems are not amenable to litter-type systems.

In view of the foregoing limitations of the prior art, it would be desirable to provide an exterior litterbox that is well vented to limit odor transfer to the interior, conveniently located for pet use, serviceable from an exterior location, and emptied without direct personal contact in the disposal process.

BRIEF SUMMARY OF THE INVENTION

The present invention provides a litterbox that is mounted on an exterior wall of a structure and has a gated passage communicating with structure interior for permitting the pet free access to and from the litterbox.The litterbox may be filled and maintained from an outside location. As required, the litterbox may be conveniently emptied into a collection bag. The litterbox includes an actuator handle for pivoting the litterbox and discharging the contents into a lower chute to which a conventional plastic waste bag is secured, thereby avoiding direct contact between the attendant and the waste material.

Accordingly, it is an object of the present invention to provide a cat litterbox that may be readily serviced from an exterior location.

Another object is to provide an litterbox for indoor cats that is well illuminated and ventilated to prevent odor transfer to a building interior.

A further object is to provide an exterior waste collection system wherein spent litter and accumulations may be discharged into a trash container without direct personal contact with soiled material.

Yet another object is to provide a litterbox in an outdoor enclosure that may be conveniently emptied by remote actuation without direct contact with the litter container or contents.

DESCRIPTION OF THE DRAWINGS

The above features and advantages of the present invention will become apparent upon reading the following detailed description taken in conjunction with the accompanying drawings in which.

DETAILED DESCRIPTION OF THE PREFERRED EMBODIMENTS

Figure 1:
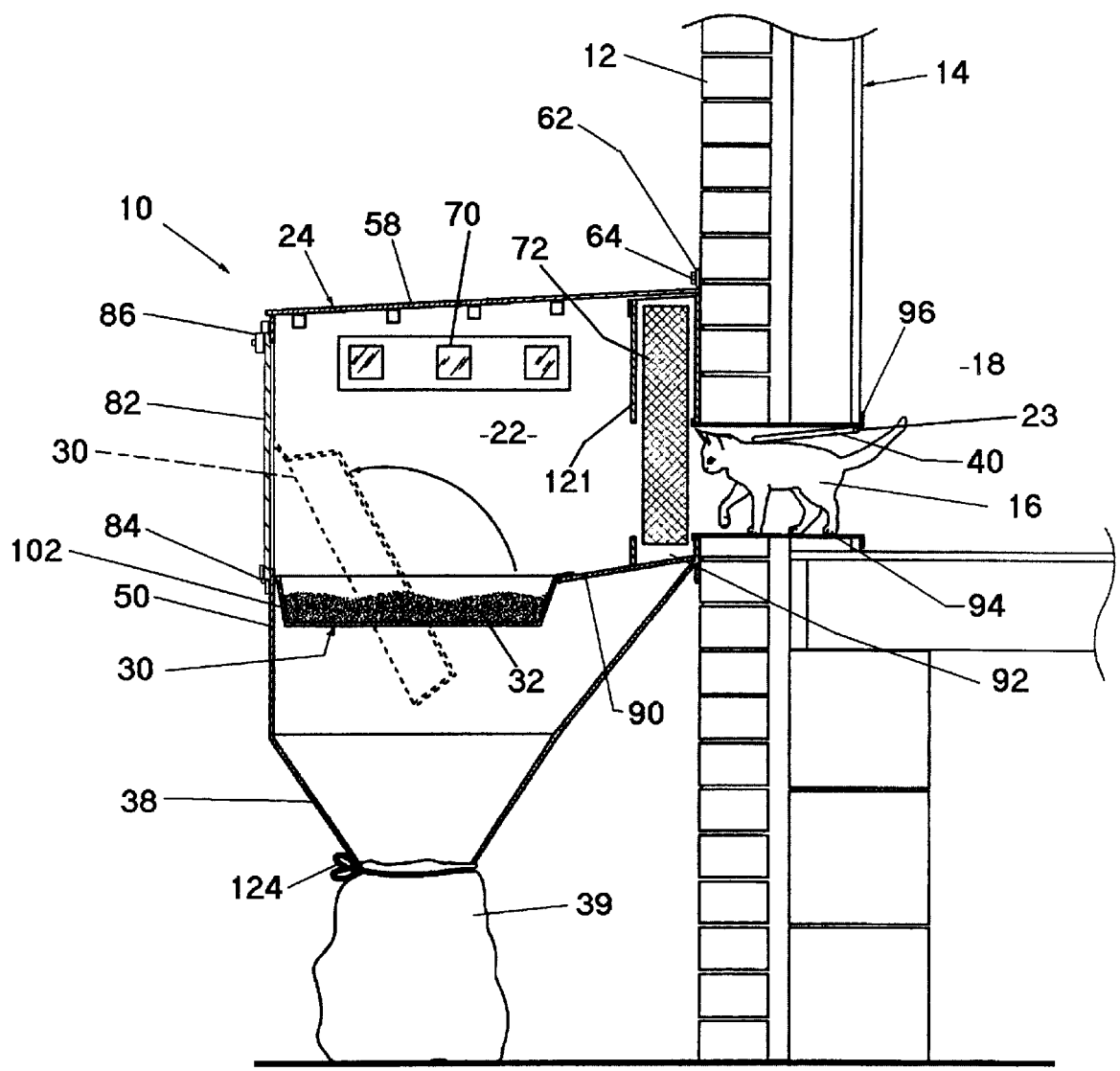
FIG. 1 is a side cross sectional view of an exterior litterbox positioned at an exterior wall in accordance with a preferred embodiment of the invention.

Referring to the drawings for the purpose of describing the preferred embodiment and not for limiting same, FIG. 1 illustrates an exterior litterbox 10 mounted on the exterior wall 12 of a structure 14 for permitting entry of a pet 16 from the structure interior 18 through a portal 20 to an enclosed litterbox area 22 defined by a litterbox enclosure 24.

The litterbox 10 is provided with a pivoting container 30 containing conventional litter material 32. As additionally shown in FIGS. 3 and 6, the container 30 is pivoted by actuating arm 34 to move the container from the normal position shown in the solid lines of FIG. 1 to the rotated disposal position shown in dashed lines to thereby discharge soiled litter material 32 downwardly through an annular opening 36 (FIG. 5) in a lower discharge chute 38 into a conventional plastic collector bag 39.

The pet 16 secures elective entrance and egress from the litterbox area 22 through a vertically disposed swinging door 40 disposed in the portal 20. As described below, the portal 20 includes a flanged duct 94 communicating the interior 18 with the litterbox area 22. The door 40 is pivotally supported by a hinge 23 positioned adjacent the inside wall of the interior 18. Other fixed or flexible partitions may also be used to provide controlled access, and to provide a weather and odor barrier between the interior 18 and the litterbox area 22.

Figure 2:
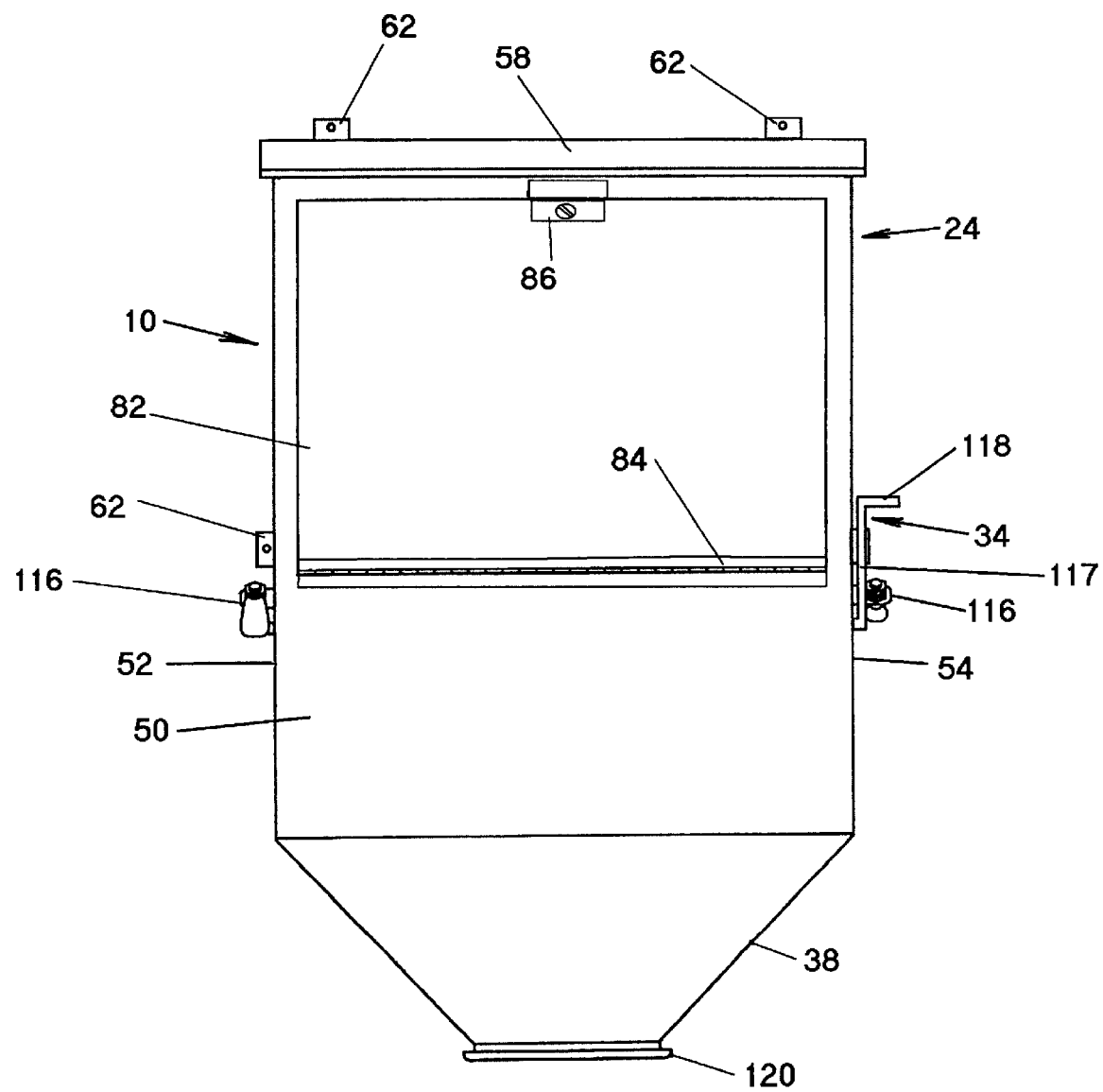
FIG. 2 is a front view of the exterior litterbox shown in FIG. 1.
Figure 3:
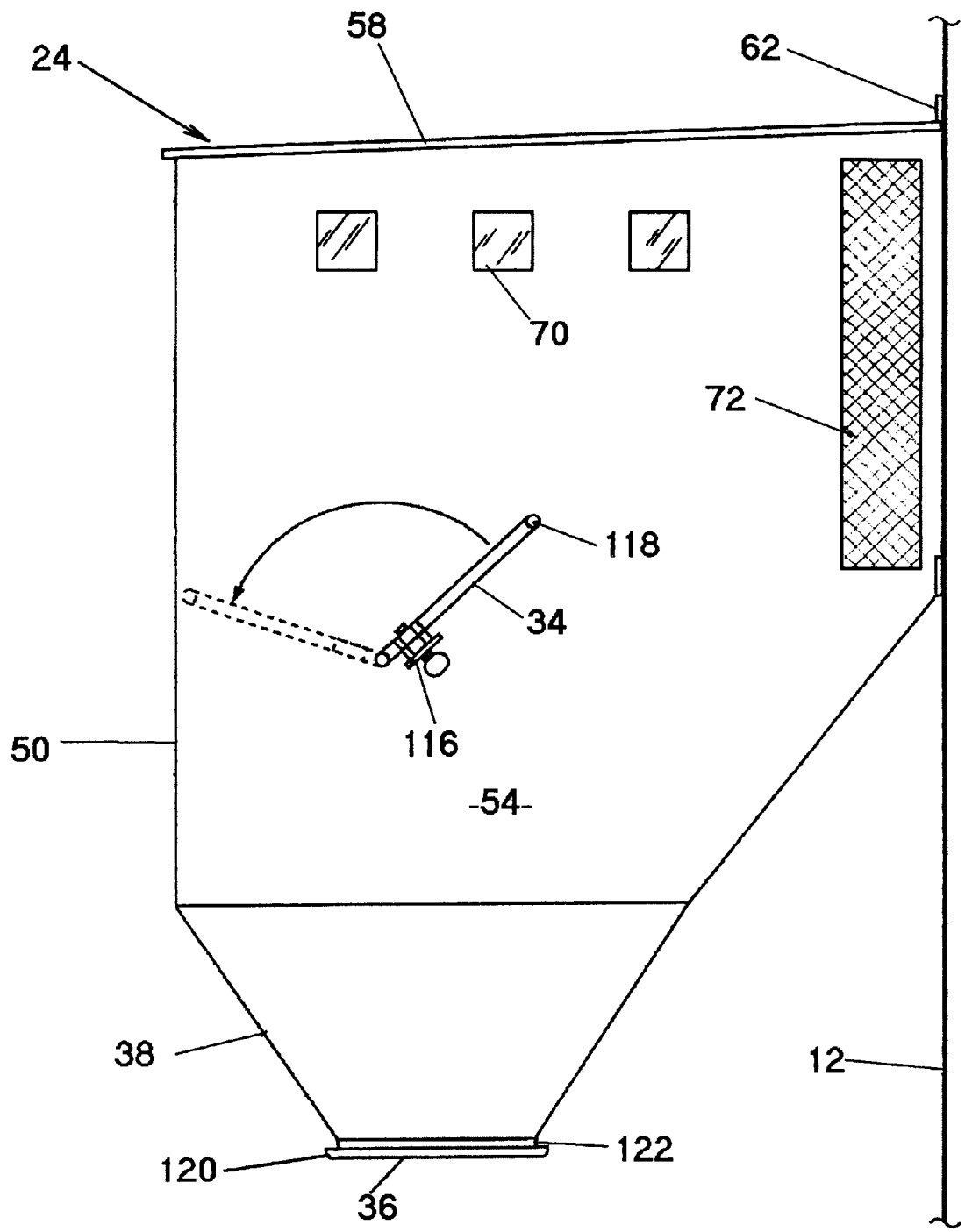
FIG. 3 is a side elevational view of the litterbox shown in FIG. 1.
Figure 4:
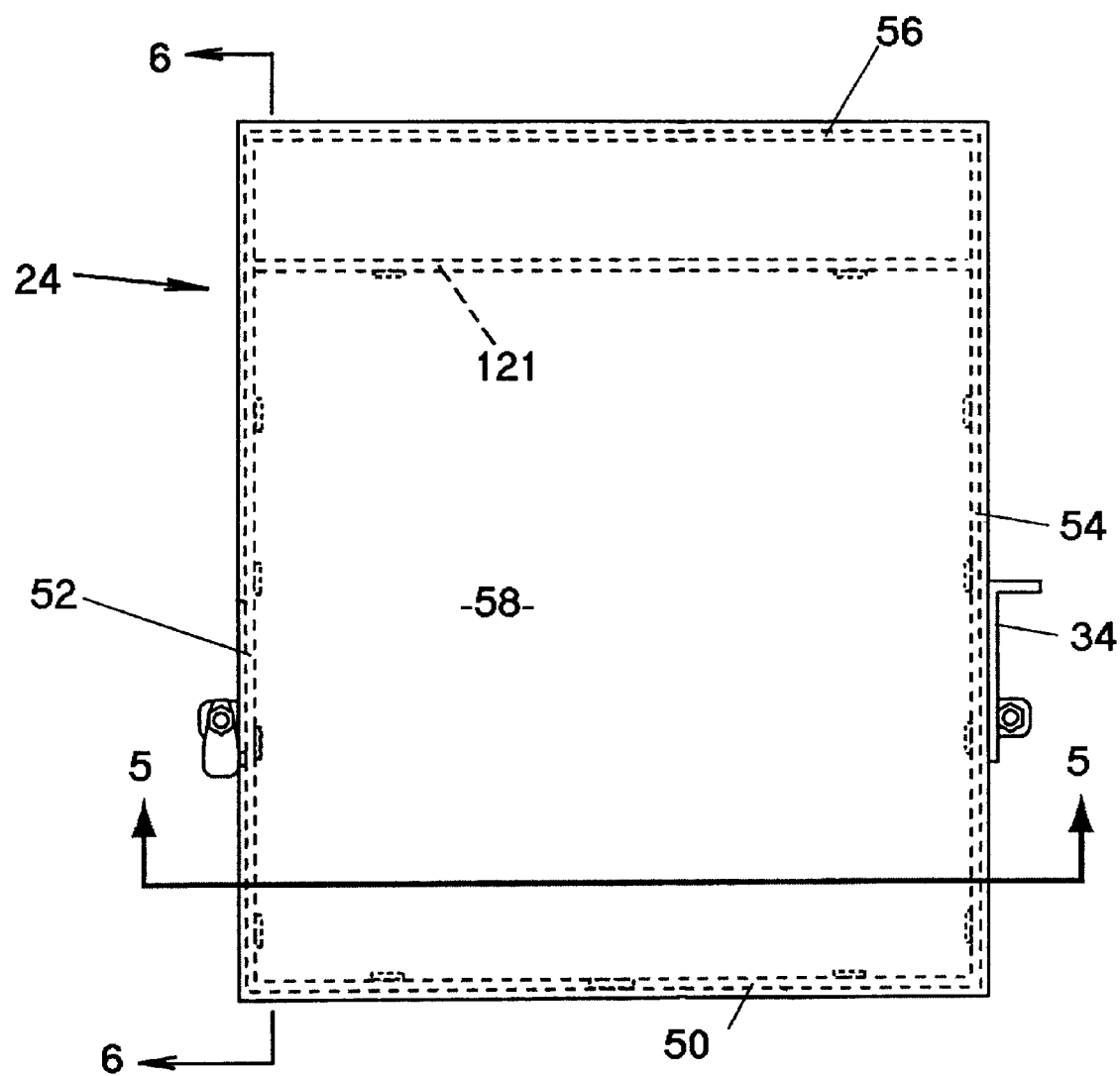
FIG. 4 is a top view of the litterbox shown in FIG. 1.
Figure 5:
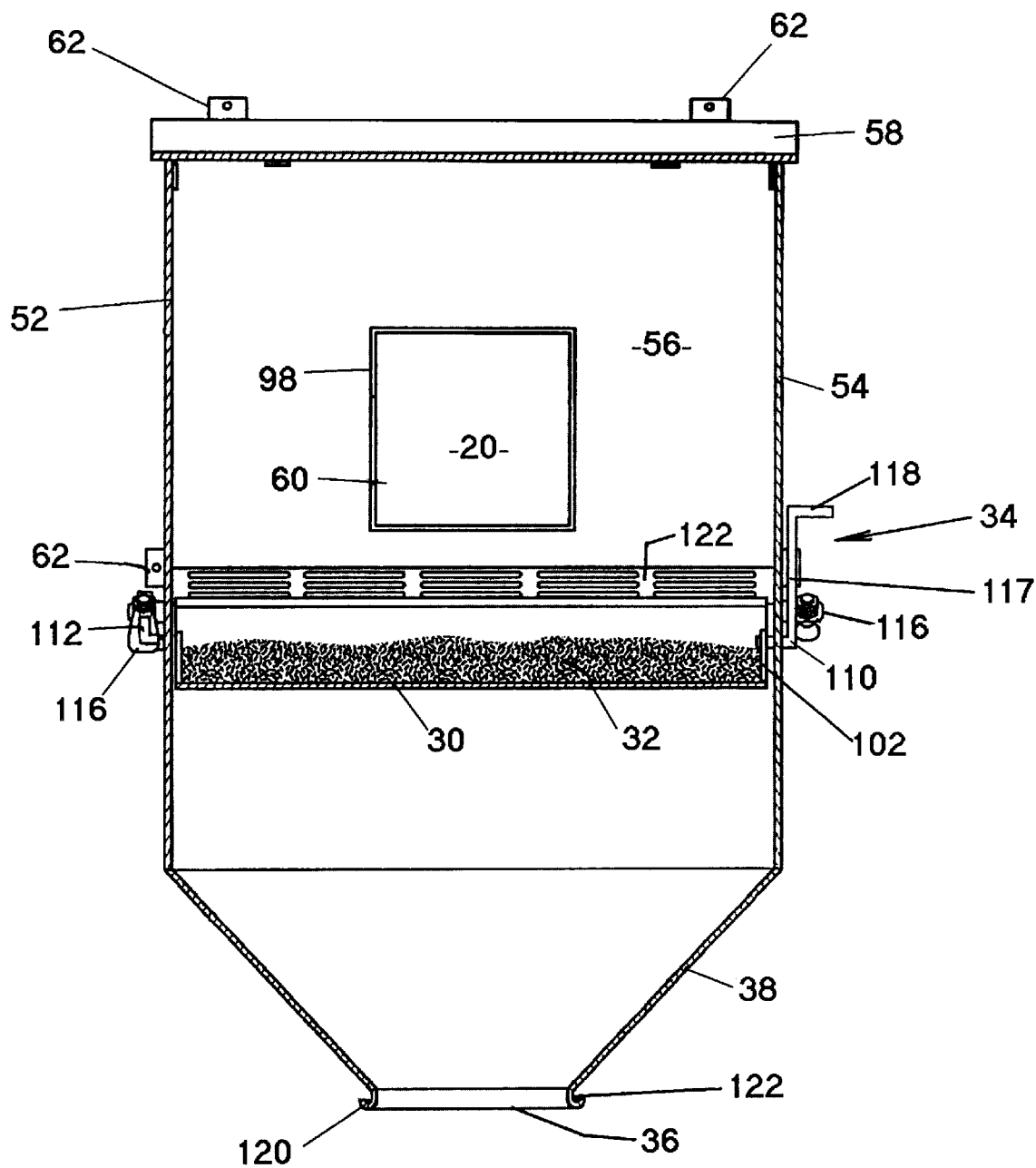
FIG. 5 is a cross sectional view taken along line 5—5 in FIG. 4.

Referring additionally to FIGS. 2 and 3, the litterbox enclosure 24 has a generally rectangular horizontal cross section defined by a front wall 50, side walls 52 and 54, rear wall 56. The walls 50, 52, 54, and 56 are upwardly enclosed by an upwardly and rearwardly inclined top wall 58 and downwardly encompassed by the chute 38. The rear wall 56, as shown in FIG. 5, includes a rectangular opening 60 communicating with the portal 20 and a plurality of vertically projecting mounting tabs 62 for securing the enclosure in mounting position on the exterior wall of the structure by appropriate fasteners 64. The side walls 52 and 54 are fixedly connected to the rear wall 56 and the front wall 50, by fasteners or weldments. The components are the enclosure are formed of sheet metal component and provided with a weather resistant finish.

The sidewalls 52, 54 contain rectangular apertures carrying horizontally oriented window panels 70 and vertically oriented ventilation panels 72 for respectively illuminating and ventilating the enclosure. The ventilation panels 72 are spaced from the litterbox area 22 by a vertical divider panel 121, thereby permitting the circulation of fresh air throughout the litterbox 10 and without entry into the house 12.

The front wall 50 is provided with a rectangular opening that is covered by a rectangular access panel 82. The access panel 82 is pivotally connected to the front wall 50 below the opening 80 by a hinge 84 for movement about a longitudinal horizontal axis between the illustrated closed position and a downwardly pivoted opened position providing access to the enclosure for replacement of litter material and interior maintenance. A keyed lock assembly 86 is mounted at the upper end of the access panel 82 for controlling exterior access.

The enclosure 24 is provided with a slightly downwardly inclined base panel 90 adjacent the portal and between the container 30 and the portal 20 providing an entry alcove 92 for the pet and providing an outside resting area or a transition prior to the litterbox container 30. The base panel 90 may be carpeted or otherwise embellished for comfort of the pet. The portal 20 includes the tubular duct 94 complementary to the portal opening having an inner flanged mounting panel 96 secured to an interior wall of the structure and an outer flanged mounting panel 98 secured to the rear wall 56. The door 40 is pivotally suspended from the top or the duct 94 and covers the opening in a normal closed position to isolate the litter box from the interior of the structure while permitting the pet to pivot the trap door readily and sufficiently to gain entrance to and egress therefrom. The door 40 additionally functions as a weather and odor barrier between the interior and the enclosure.

Figure 6:
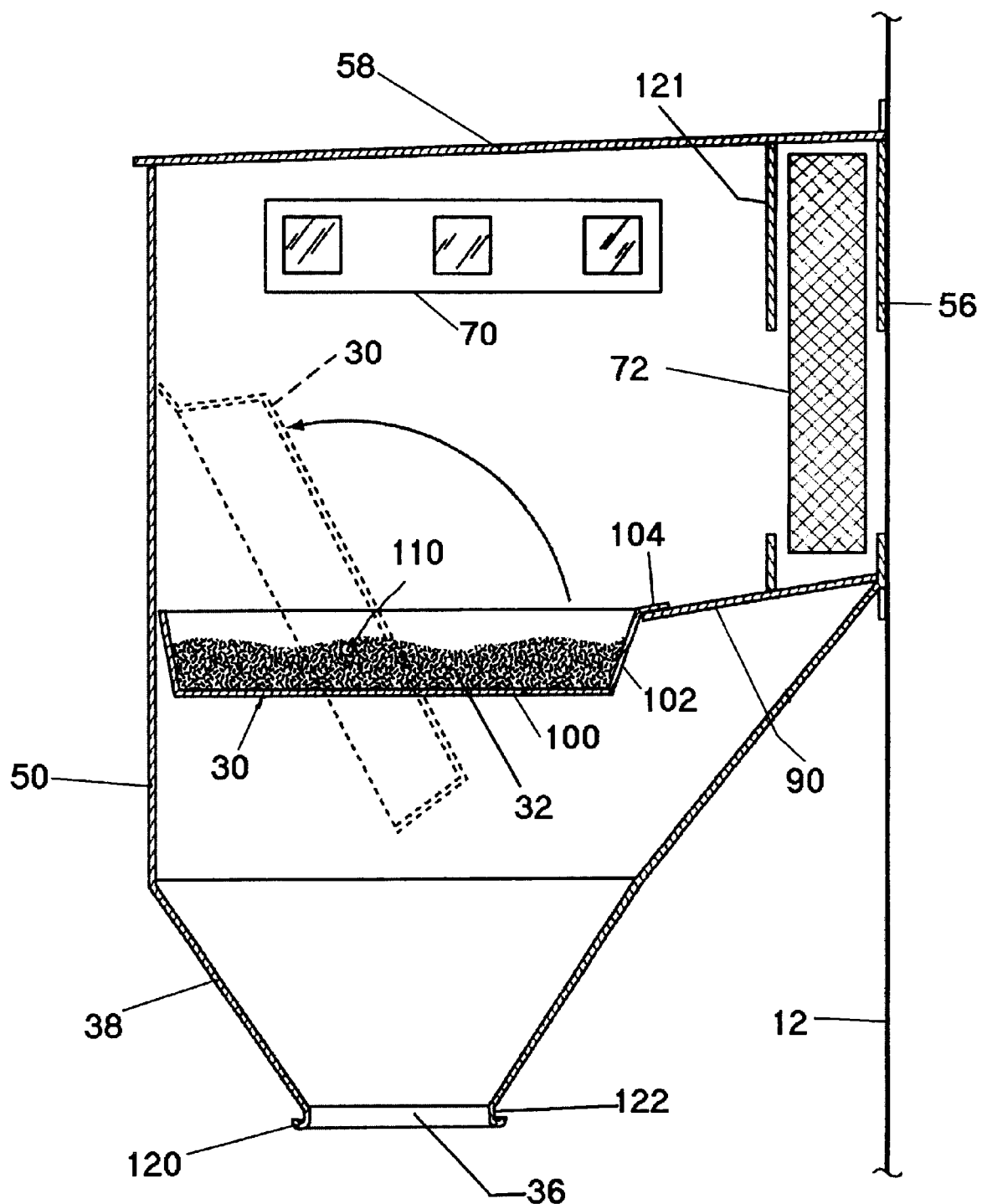
FIG. 6 is a cross sectional view taken along line 6—6 in FIG. 4.

Referring to FIG. 6, the litter box container comprises a rectangular base 100 surrounded by peripheral walls 102 defining an upwardly opening receptacle for holding a desired amount of litter material 32. The walls 102 are closely adjacent the front wall and side walls and have a slight clearance relation therewith. The rearward peripheral wall is provided with a rearwardly projecting lip 104 overlying the base panel 90 and establishing an affirmative stop in the normal position.

Referring additionally to FIG. 5, a pair of laterally extending support shafts 110 are attached at proximal inner ends to the container. The shafts 110 are rotatably journaled at midportions in apertures in the side walls 52, 54. The shafts 110 have distal outer ends projecting beyond the side walls. One shaft terminates with a stop arm 112. The other shaft includes the actuator arm 34. The stop arm 112 and the actuator arm 34 engage adjustable stops 116 attached to the side walls for limiting and adjusting the position of the container 30 in the normal position. The shafts are forwardly located on the container to provide an eccentric pivot axis for the container thereby providing gravitational biasing to the normal position. The actuator arm 34 includes a side arm 117 orthogonal to the shaft 110 and a laterally projecting handle 118. As will be apparent the handle 118 may be manually rotated to permit an attendant to pivot remotely the container 30 between the aforementioned positions for emptying the litterbox container.

The chute 38 is defined by downwardly and inwardly converging panels terminating with an annular flange 120 defining the discharge opening 39. The flange 120 is provided an outwardly opening circumferential groove 122 for securing the litter collection bag 39 thereto by tie fastener 124.

In usage, the litterbox 10 is mounted on a selected exterior wall sufficiently above ground level to permit use of the collection bag while providing suitable interior access by the pet. A suitable opening is formed, initially or subsequently, for registering with the portal 20. After installation, the access panel 82 is unlocked and opened and the litter material 32 disposed in the container 30. The access panel 82 is closed and locked. Thereafter, the pet may access the enclosure as needed or desired. When the litter material has been consumed and requires replacement, the attendant secures the collection bag to the chute 38 with the fastener 124, The handle 118 is rotated to pivot the container 30 to the discharge position thereby depositing the contaminated material into the chute 38 and into the collection bag, without directly exposing the attendant to soiled litter and accumulations. Thereafter, the container is returned to the normal position. The access door is opened, the container refilled with litter material, the access door closed and use resumed.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claims.

What is claimed:

1. A litterbox for mounting exteriorly of a structure and communicating with the interior of the structure with a passage for accommodating an animal desirous of using the litterbox, said litterbox comprising: an enclosure for connection to the exterior of the structure, said enclosure having an apertured rear panel for communication with the passage a container disposed in said enclosure for holding litter material; pivot means operatively connecting said container with said enclosure and permitting pivotal movement of said container between a horizontal nominal position and an inverted discharge position for downwardly discharging said litter material; actuator means operatively connected with said pivot means and disposed exteriorly of said enclosure for enabling selective pivoting of said container between said normal position and said discharge position; a discharge chute located at a lower portion of said enclosure having an annular opening through which said litter material is discharged when said container is in said discharge position; and collection means releasably connected with said discharge chute for receiving litter discharged through said opening.

2. The litterbox as recited in claim 1 including portal means complementary to said passage in said structure and defining a pathway for said pet.

3. The litterbox as recited in claim 2 wherein said portal means includes a pivoting door for closing said passage in a normal position and moveable by said pet to a transit position permitting entrance to and egress from said enclosure.

4. The litterbox as recited in claim 3 wherein said opening in said discharge chute is annular and includes a circumferential groove.

5. The litterbox as recited in claim 4 wherein said collection means is a plastic bag.

6. The litterbox as recited in claim 5 wherein said plastic bag includes tie means secured in said circumferential groove for maintaining said plastic bag in position for receiving discharged lifter material.

7. The litterbox as recited in claim 6 wherein said actuator means includes an actuating handle projecting exterior of said enclosure.

8. The litterbox as recited in claim 7 wherein said pivot means includes a pair of lateral shafts connected to lateral surfaces on said litterbox and rotatably supported on said enclosure.

9. The litterbox as recited in claim 8 wherein said shafts are eccentrically connected to said lateral surfaces.

10. The litterbox as recited in claim 1 including an access door on said enclosure moveable between a closed position and an open position providing access to said litterbox.

11. The litterbox as recited in claim 10 including lock means for securing said access door in said closed position.

12. The litterbox as recited in claim 1 including window means on said enclosure for providing visibility to the interior.

13. The litterbox as recited in claim 12 including ventilation means for permitting air circulation in said interior.

14. The litterbox as recited in claim 13 wherein said ventilation means are located adjacent said rear panel and a vertical divider panel is located between said ventilation means and said container.

15. The litterbox as recited in claim 14 including alcove means connecting said portal means with said container.

* * * * *